US012764427B2

(12) United States Patent
Shin et al.

(10) Patent No.: US 12,764,427 B2
(45) Date of Patent: Oct. 13, 2026

(54) FLOOR PLAN CONSTRUCTION SYSTEM AND METHOD

(71) Applicant: DOLBY LABORATORIES LICENSING CORPORATION

(72) Inventors: Philip Wootaek Shin, University Park, PA (US); Janos Horvath, Santa Clara, CA (US); Guan-Ming Su, Fremont, CA (US)

(73) Assignee: DOLBY LABORATORIES LICENSING CORPORATION

( * ) Notice: Subject to any disclaimer, the term of this patent is extended or adjusted under 35 U.S.C. 154(b) by 0 days.

(21) Appl. No.: 19/014,011

(22) Filed: Jan. 8, 2025

(65) Prior Publication Data

US 2025/0234102 A1 Jul. 17, 2025

Related U.S. Application Data

(60) Provisional application No. 63/621,372, filed on Jan. 16, 2024.

(51) Int. Cl.
*H04N 23/90* (2023.01)
*G06T 7/73* (2017.01)
*G06V 10/77* (2022.01)

(52) U.S. Cl.
CPC ............... *H04N 23/90* (2023.01); *G06T 7/73* (2017.01); *G06V 10/77* (2022.01); *G06V 2201/07* (2022.01)

(58) Field of Classification Search
CPC .......... H04N 23/90; G06T 7/73; G06V 10/77; G06V 2201/07
See application file for complete search history.

(56) References Cited

U.S. PATENT DOCUMENTS

| | | | | |
|---|---|---|---|---|
| 9,177,259 | B1 | 11/2015 | Levchuk | |
| 9,430,749 | B2 | 8/2016 | Nagy | |
| 11,574,442 | B2 | 2/2023 | Sun | |
| 11,657,419 | B2 | 5/2023 | Eder | |
| 11,714,518 | B2 | 8/2023 | Gharpuray | |
| 2022/0318441 | A1 | 10/2022 | Jagannathan | |
| 2022/0327316 | A1 | 10/2022 | Grauman | |
| 2023/0125295 | A1* | 4/2023 | Min .......................... | G06T 7/74 701/25 |
| 2023/0401725 | A1* | 12/2023 | Truong .................. | G06Q 30/06 |

OTHER PUBLICATIONS

Bailey et al., "Simultaneous localization and mapping (SLAM): part II." IEEE Robotics & Automation Magazine, 13 (3) (Sep. 2006), pp. 108-117.

Dosovitskiy et al., "An image is worth 16×16 words: Transformers for image recognition at scale." arxiv:cs.CV/2010.11929. Jun. 3, 2021, pp. 1-22.

(Continued)

*Primary Examiner* — Farzana Hossain

(57) ABSTRACT

Novel methods and systems for creating a 2D floor plan visualization from video from sparse camera views, based on object recognition creating latent vectors for camera pose estimation. Estimated camera poses are converted to world coordinates, which are projected onto a 2D plane. These world coordinates can be used to form the 2D floor plan, useful for user interface implementation.

19 Claims, 6 Drawing Sheets

(56) References Cited

OTHER PUBLICATIONS

Ge et al., “YOLOX: Exceeding YOLO series in 2021.” arXiv:2107.08430, 2021, Aug. 6, 2021.
He et al., “Deep residual learning for image recognition.” arXiv:1512.03385 (2015).pp. 770-778.
Lin et al., “Relpose++: Recovering 6D poses from sparse-view observations.” arXiv preprint arXiv:2305.04926, May 8, 2023, pp. 1-16.
Makiewicz et al., “Principal Components Analysis (PCA).” Computers & Geosciences. vol. 19, Issue 3, Mar. 1993, pp. 303-342.
Nister et al., “Visual Odometry,” IEEE Computer Society Conference on Computer Vision and Pattern Recognition, 2004. CVPR 2004. vol. 1. doi:10.1109/CVPR.2004.1315094, (Jan. 2004). pp. 1-8.
Ravi et al., “Accelerating 3D Deep Learning with PyTorch3D”, arXiv:2007.08501, (Jul. 16, 2020)., pp. 1-18.
Redmon et al., “Yolo9000: better, faster, stronger” doi.org/10.48550/arXiv.1612.08242, Dec. 25, 2016, pp. 1-9.
Redmon et al., “You only look once: Unified, real-time object detection.” openaccess.thecvf.com/content_cvpr_2016/papers/Redmon_You_Only_Look_CVPR_2016_paper.pdf., pp. 779-788.
Schonberger et al., “Structure-from-motion revisited,” In Proceedings of the IEEE Conference on Computer Vision and Pattern Recognition, pp. 4104-4113, 2016.
Shao et al., “Objects365: A large-scale high-quality dataset for object detection”, Proc. IEEE/CVF Int. Conf. Comput. Vis. (ICCV), pp. 8430-8439, Oct. 2019. pp. 8429-8438.
Zhang et al., “RelPose: Predicting probabilistic relative rotation for single objects in the wild.” doi.org/10.48550/arXiv.2208.05963, Oct. 3, 2022, pp. 1-26.
Bouldin et al., “A Cluster Separation Measure”. IEEE Transactions on Pattern Analysis and Machine Intelligence. PAMI-1 (2), Apr. 1979, pp. 224-227.
Lindenberger et al., LightGlue: Local Feature Matching at Light Speed. arXiv preprint arXiv:2306.13643, Jun. 23, 2023, pp. 1-18.
Rousseeuw, Peter J., “Silhouettes: a Graphical Aid to the Interpretation and Validation of Cluster Analysis”. Computational and Applied Mathematics. 20: pp. 53-65, 1987.
Sarlin et al., Superglue: Learning feature matching with graph neural networks. In Proceedings of the IEEE/CVF conference on computer vision and pattern recognition, arXiv:1911.11763v2 [cs.CV], Mar. 28, 2020, (pp. 4938-4947).
Yang et al., “Wider face: A face detection benchmark,” In Proceedings of the IEEE Conference on Computer Vision and Pattern Recognition, Nov. 20, 2015, arXiv:1511.06523v1 [cs.CV], pp. 1-12, 2016.

* cited by examiner

FLOOR PLAN CONSTRUCTION SYSTEM AND METHOD

CROSS REFERENCE TO RELATED APPLICATIONS SECTION

This application claims priority to U.S. Provisional Patent Application No. 63/621,372, filed on Jan. 16, 2024, of which is incorporated herein by reference in its entirety.

TECHNICAL FIELD

The present disclosure relates to improvements for constructing floor plans for interactive video control. More particularly, it relates to methods and systems for providing an end-to-end pipeline providing real-time floor plan construction from multiple sparse camera views.

BACKGROUND

In some instances, an event is streamed or recorded on multiple cameras covering the event from different views. For example, there might be one camera viewing from the right, one from the left, and one or more from the front. Typically, the video provider controls which camera is used for the video stream/recording.

Most viewers today watch video content on a device that allows user interaction with the video—computers, smartphones, tablet devices, etc. These allow the user control over how they experience the video through user interface controls.

Some user interface controls utilize icons presented on the screen with the video that can be selected (by touch screen, mouse click, or the like) to control the video.

SUMMARY

The methods and systems herein present an effective way to construct a 2D floor plan visualization of multiple sparse camera views which can be used, for example, with a user interface such that a user can select in real-time which camera's view to use for a video stream/playback in an interactive manner.

An embodiment of the present invention is a method to construct a 2D floor plan visualization based on the views of a plurality of sparse cameras viewing one or more objects of interest, the method comprising: performing computer object detection on the one or more objects of interest for video from each of the plurality of sparse cameras; performing feature extraction from the computer object detection; performing feature aggregation on features of the feature extraction creating latent vectors; transforming the latent vectors to view features; estimating camera poses for each of the plurality of sparse cameras based on the view features; transforming estimated camera poses into world coordinates; and constructing the 2D floor plan visualization based on the world coordinates.

A further embodiment of the present invention is a system, comprising: an object detection module configured to perform computer object detection from video data from a plurality of sparse cameras; a latent feature extraction module configured to convert data from the object detection module into latent vectors for views of each of the plurality of sparse cameras; a latent vector aggregation module configured to aggregate the latent vectors into aggregated latent vectors; a transformer module configured to convert the aggregated latent vectors into view features; a camera pose estimation module configured to estimate camera poses for each of the plurality of sparse cameras from the view features; and a single-frame floor plan construction module configured to construct the 2D floor plan visualization from the estimated camera poses.

DETAILED DESCRIPTION

In embodiments herein, systems and methods for an end-to-end pipeline to generate floor plans from multiple videos from sparse camera views is disclosed. The generated floor plan can be used to navigate the view selection and facilitate the transverse of multiple perspectives of a scene. One practical application of this technology is with a user interface, enabling users (e.g., viewers) to access a floor plan with various camera locations. The users can then actively engage with the content by playing synchronized multi-perspective audio/video, selecting via a user interface which perspective to view at any given time. This interactive experience allows users to take advantage of the different views under their control, providing an immersive and captivating experience.

The term "sparse camera views" as used herein refers to two or more cameras where at least two of the cameras presents a different view (direction, elevation, and/or height) of an object of interest.

The term "object of interest" or "objects of interest" as used herein refers to the object or collection of objects, including a person or people, or even a location in a scene, that is the shared subject of the video views. For example, a video of a person giving a speech would have the person giving the speech the "object of interest", perhaps also including a lectern that the person is standing behind. The use of the term "object" as used herein can also refer collectively to all objects of interest in the scene. The object of interest corresponds to the image processing "region of interest".

The term "scene" as used herein refers to the general physical space that the object of interest is in when being viewed by the cameras.

The term "floor plan" as used herein refers to a 2D visualization (map) of camera view positions relative to an object of interest.

Figure 1:
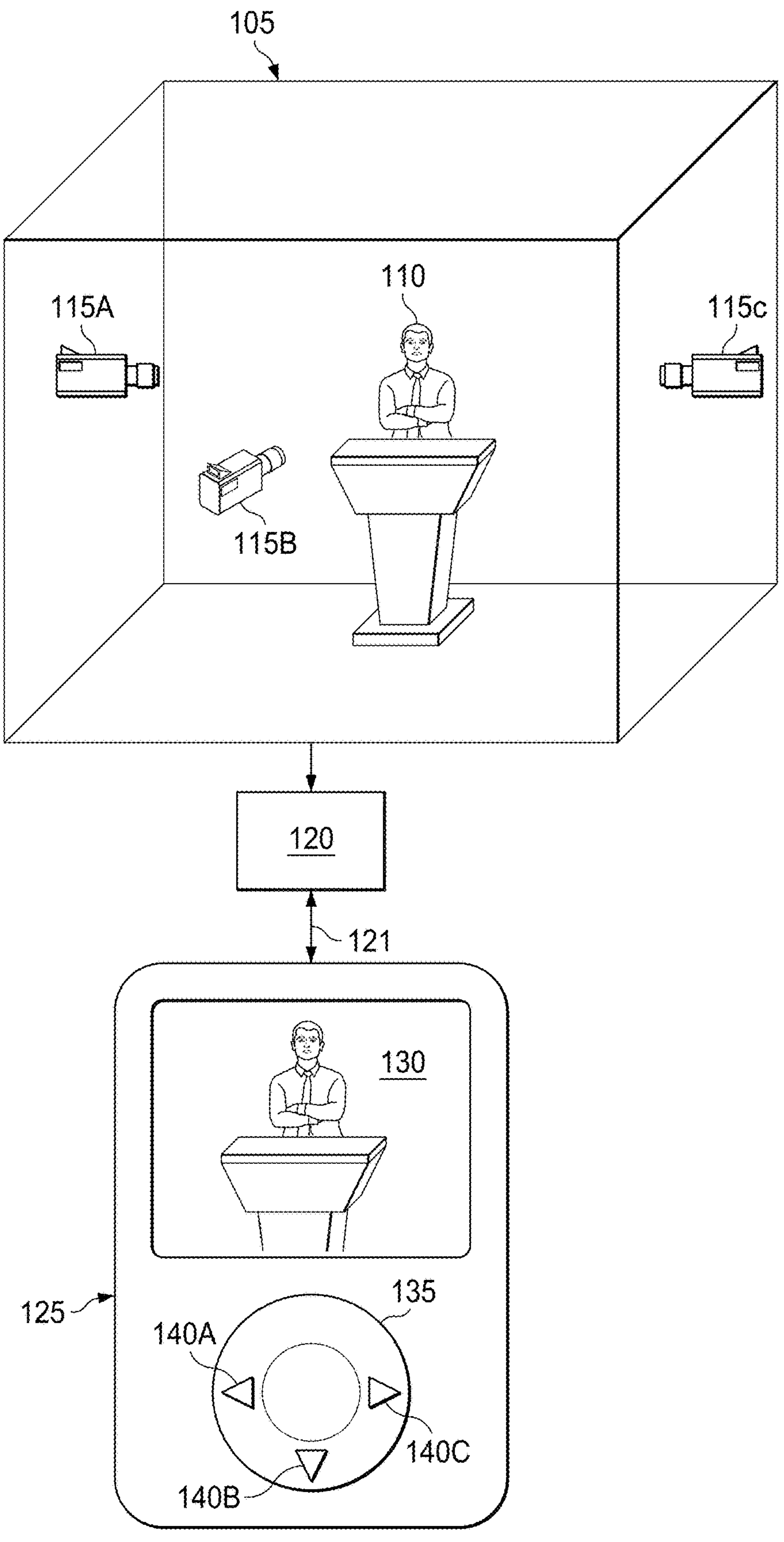
FIG. 1 illustrates an example of the floor plan in use.

FIG. 1 shows an example of the floor plan in use. A scene (105) of an object of interest (110) is videoed from multiple cameras (115A, 115B, 115C) at different locations, heights, and angles. In this example, one camera is at the left (115A) of the object (110), here a person giving a speech, one camera is at the right (115C), and one is low and to the front aimed upwards (115B). The feeds from all cameras are fed to a central system (120) which streams it (121), either live or recorded, to a user's video screen (125), such as for a computer, smartphone, console, tablet, or the like, where the user can view the scene on a portion of the screen (130). The image on the screen is controlled by a user interface (135) presented on the screen (or on a separate screen) which allows the selection of which camera's view (115A, 115B, or 115C) to show on the screen by selecting icons (140A, 140B, 140C) that correspond to the cameras' relative positions around the object of interest (110). This arrangement of icons (140A, 140B, 140C) in the user interface (135) is created from the floor plan, dynamically generated based on the video feeds from the cameras (115A, 115B, 115C). In this example, the user interface (135) is shown as a circle and the camera icons (135) are shown as triangles with the wide end directed to the object of interest, but other shapes can be used (such as a rectangular interface with camera shaped icons). Other indicators can also appear in the user interface, such as an icon or image showing the item of interest's location relative to the cameras. In some embodiments, changing the views also changes the audio source respectively. In some embodiments, the audio source selection is separate from the camera view selection.

In embodiments of the floor plan, the floor plan is generated by a system that capitalizes on latent feature aggregation and camera pose estimation. This is an improvement over previous systems that use retrieval of camera pose estimation [1], which usually require accurate feature extraction and precise matching to perform well, or techniques like simultaneous location and mapping (SLAM) [2] or visual odometry [3], which are dependent on visual data and feature-based motion estimation. These previous methods have been shown to have particular limitations when applied to sparse camera views, which the present disclosed method overcomes.

Figure 2:
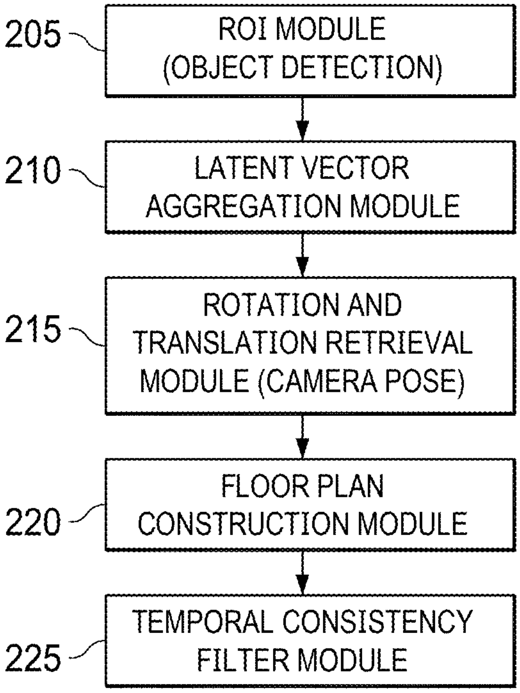
FIG. 2 illustrates an example end-to-end pipeline for floor plan creation.

FIG. 2 shows an example pipeline for the system. The example pipeline entails five principal modules:

1) Object Detection module (205) configured to acquire bounding boxes for various objects, in other words a Region of Interest (ROI) module;
2) Latent Vector Aggregation module (210) configured to convert each of these bounding boxes into a latent vector (latent feature extraction) and aggregate these latent features;
3) Camera Pose Estimation module (215) configured to used deep-learning (similar to RelPose++ [4]) to obtain the Rotation and Translation metrics from the aggregated latent features, not from the image or pixels;
4) Single-Frame Floor Plan Construction module (220) configured for Floor Plan creation utilizing Principal Component Analysis (PCA) [5], Rotation, and Projection; and
5) Temporal Consistency module (225) that uses a temporal Consistency Filter configured to estimate the camera pose given a video input.

This pipeline provides an end-to-end pipeline for floor plan construction from multiple sparse camera view video using novel algorithms (particularly for modules 2, 4, and 5) involving enhanced camera pose estimation stability by considering both spatial and temporal consistency.

Object Detection

Object detection, a salient subfield of computer vision, is the technology that allows machines to identify and locate objects within an image or a sequence of images. It differs from image classification, which only assigns a label to an entire image, by additionally providing the spatial location and extent of one or many objects within the image. Common applications of object detection include self-driving cars, surveillance, image retrieval systems, and medical imaging.

The major challenge in object detection is the variation in size, shape, color, texture, and orientation of objects, which demands algorithms with robust discriminatory and generalization power. Traditional methods such as Viola-Jones algorithm and Scale-Invariant Feature Transform (SIFT) dealt with these challenges to a degree, but with the advent of deep learning, Convolutional Neural Networks (CNNs) have significantly improved the performance in object detection tasks.

Any deep-learning method of object detection can be utilized for the embodiments described herein. As an example, the YOLO (You Only Look Once) methods are described.

Among the deep-learning based methods, YOLO [6] has gained immense popularity due to its speed and efficiency. Unlike the two-stage detectors such as R-CNN and its variants, YOLO employs a single-stage detector strategy, making it significantly faster and suitable for real-time applications.

YOLO is an end-to-end system that concurrently predicts class probabilities and bounding box coordinates for an image. The core idea is to divide the input image into an S×S grid and for each grid cell, predict multiple bounding boxes and class probabilities. The bounding box prediction includes coordinates (x, y) for the center of the box, along with its width and height. Class probabilities indicate the likelihood of the object belonging to a particular class. A key characteristic of YOLO is that it views the detection problem holistically, thereby dramatically increasing the speed of detection.

Since the inception of YOLO, subsequent versions have been developed, each addressing limitations of its predecessor. YOLOv2 [7], also known as YOLO9000, can detect over 9000 object categories by joint training on classification and detection tasks, leveraging hierarchical clustering for designing anchor boxes, and using a multi-scale training method. YOLOv3 incorporated three different scales for prediction by utilizing feature maps from multiple layers of the network, thereby enhancing the detection of smaller objects. YOLOv4 was proposed to make efficient use of the computational resources while still maintaining top-tier performance.

Currently, YOLOv8 [8], developed by Ultralytics™, represents a state-of-the-art model that builds upon the successes of its preceding versions within the YOLO framework. Another alternative for bounding box retrieval lies in YOLOX [9].

The YOLOv8 takes an RGB image as input. Its output are multiple ROIs consisting of a classID, which identifies the object category, and the location of the bounding box.

The output format of YOLOv8 is as follows:

classID centerX centerY width height

The location of the bounding box can be retrieved using bounding box's centerX, and centerY and bounding box width and height. The YOLOv8 output is saved in a .txt file, which may contain multiple lines representing detected objects with no comma in between each value. Utilizing the classID and the bounding box location, the system can identify the position of the bounding box for a specific class and obtain the targeted bounding box. This targeted bounding box can then be utilized as input for the latent feature aggregation module.

In some embodiments, the system creates bounding boxes for all objects of interest in the scene. In some embodiments, the system aggregates bounding boxes for multiple objects of interest, in some embodiments aggregating all objects into a single bounding box.

Latent Vector Aggregation

Figure 3:
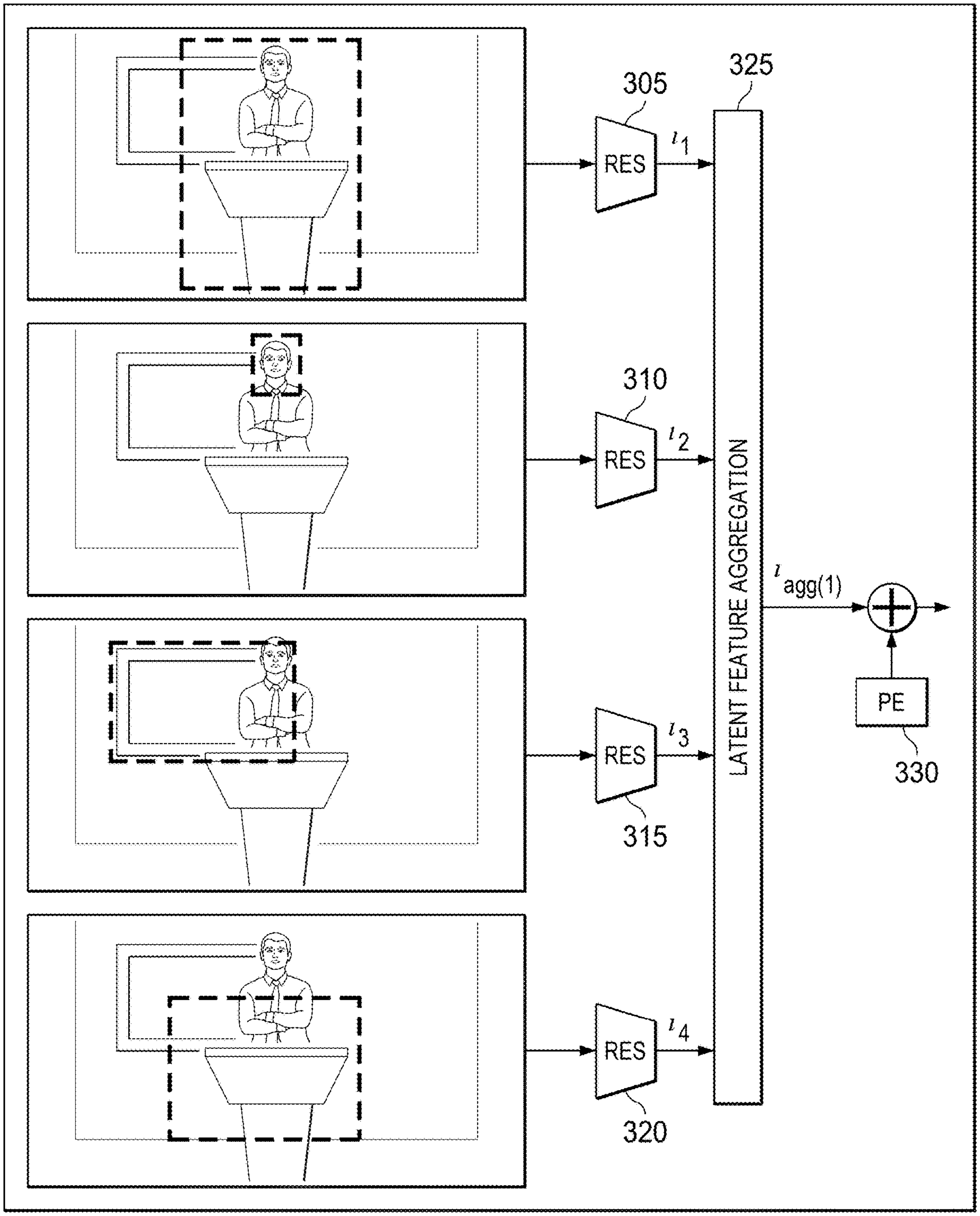
FIG. 3 illustrates an example of latent feature aggregation for a camera view.

For each viewpoint, there are multiple Region of Interest (ROI) that will be selected (identified from previous object detection module). To further illustrate, FIG. 3 shows the View 1 module containing different ROI such as person (305), face (310), television (315), and guitar (320). Note that this ROI would be selected by the object detection module. For every ROI, the process begins by extracting image features (325). This can be done, for example, using a ResNet 50 [11] or other feature extraction module. The extraction results in latent vectors labeled, in FIG. 3, as $l_1$, $l_2$, $l_3$, $l_4$. Latent Vectors don't require much investigation since they are embedded by ResNet itself, but the range of the latent vectors can be all real numbers. These latent vector features are subsequently utilized as input for latent feature aggregation, yielding an output denoted as $l_{agg(1)}$ (i.e. latent aggregated feature vector for view 1) in FIG. 3. Following this, $l_{agg(1)}$ is concatenated with the positionally encoded (PE) view index (330). In this example the positional encoding for view 1 is just 1 and is fed as input to the trained transformer (see Transformer in FIG. 4) in Relpose++. This step is done for all camera views. The number of input views can be designated as N.

For latent feature aggregation, there are at least 6 different methods: addition (add), averaging (avg), multiplication (mul), max pooling (max), min pooling (min) and Principal Component Analysis (PCA) to perform feature aggregation. Assuming that $l_i$ is the $i^{th}$ feature vector in latent space retrieved from $i^{th}$ ROI among $\hat{n}$ different ROIs. Note there here in latent space, element wise operations are done.

1. Addition: The feature vectors are element-wise added together. If the vectors are of the same dimension, the resulting vector will also be of the same dimension.

$$l_{add} = \sum_{i=1}^{\hat{n}} (l_i);$$

2. Averaging: For averaging, after adding the vectors together, divide the sum by the number of vectors to get the average.

$$l_{avg} = \sum_{i=1}^{\hat{n}} \frac{(l_i)}{\hat{n}};$$

3. Multiplication: Like addition, this involves element-wise multiplication of the feature vectors. This may be useful in situations where the presence of a feature in both vectors is more significant.

$$l_{mul} = \prod_{i=1}^{\hat{n}} (l_i)$$

4. Max Pooling: Max pooling operates by selecting the maximum value from each pair of corresponding features in the feature vectors. This can be used when the maximum response across features is important.

$$l_{max} = \max(l_1 \ \ldots \ l_{\hat{n}})$$

5. Min Pooling: Min pooling operates by selecting the minimum value from each pair of corresponding features in the feature vectors. This can be used when the minimum response across features is important.

$$l_{min} = \min(l_1 \ \ldots \ l_{\hat{n}})$$

6. PCA: finds the plane that minimizes the squared perpendicular distance to the points (see below.

Both addition and averaging methods yield equivalent performance. On the other hand, multiplication, max pooling, and min pooling might not produce satisfactory results. The reason behind this failure lies in the fact that the latent vector is not bounded within the range of [0, 1] or [−1, 1]. Consequently, applying operations such as max pooling, min pooling, and multiplication could lead to significant changes in the latent values, resulting in suboptimal outputs.

The position encoding result will be also appended to the latent vector. In this example, denote $l_{agg(k)}$ (selected from one of above methods) as aggregated latent features with position encoding result in view k module.

Camera Pose Estimation

In computer vision, a 6D camera pose refers to the combination of the camera's position and orientation in three-dimensional space. It is called "6D" because it uses six degrees of freedom (DOF) to fully describe the camera's pose: three for translational (linear) movement along the X, Y, and Z axes, and three for rotational (angular) movement (often referred to as pitch, yaw, and roll).

Translation: This corresponds to the location of the camera in 3D space, relative to a reference point. In other words, it's the camera's position along the X, Y, and Z axes.

Rotation: This describes the camera's orientation, or the direction in which it is pointing. The rotation can be represented using different conventions, such as Euler angles (pitch, yaw, roll), a rotation matrix, or a quaternion.

6D camera pose estimation is a challenging problem due to various factors such as occlusions, lighting conditions, scene complexity, and the need for real-time performance in many applications.

Any 6D pose estimation method can be used for the embodiments herein. For example, the RelPose methods are described.

The RelPose [10] framework offers a data-driven approach to infer camera viewpoints from multiple images of arbitrary objects, a task crucial for both traditional geometric pipelines like SfM (Structure from Motion) and SLAM (Simultaneous Localization and Mapping), as well as modern neural approaches like NeRF (Neural Radiance Fields). RelPose diverges from correspondence-driven methods that struggle with sparse views, instead using an energy-based formulation to represent distributions over relative camera rotations, allowing for the representation of multiple camera modes due to object symmetries or views. From these relative predictions, RelPose estimates a consistent set of camera rotations from multiple images. This system outperforms existing methods on sparse image sets and can be employed as a vital step toward in-the-wild reconstruction from multi-view datasets. Furthermore, it can infer accurate poses for novel instances of various classes and even those from unseen categories.

RelPose++, an enhancement of the RelPose framework, tackles the challenge of estimating 6D camera poses from a sparse set of 2-8 images. This task is useful in neural reconstruction algorithms, particularly when objects have visual symmetries and texture-less surfaces. Key improvements include using attentional transformer layers for processing multiple images jointly to resolve possible ambiguities and expanding the network to report camera translations by defining a distinct coordinate system. The system significantly outperforms previous methods in 6D pose prediction for both familiar and unfamiliar object categories and enables pose estimation and 3D reconstruction for in-the-wild objects. This RelPose++ framework can be used to estimate the rotation and translation of the object.

The RelPose++ takes a sparse set of input views, ranging from 2 views to 8 views, and generates 6D poses (rotation and translations). In embodiments herein, the feature aggregation module requires novel adjustments to the original RelPose++ architecture: instead of taking images of views, the system skips that step and utilizes the trained RelPose++ transformer to take the aggregated features from the views directly, while still outputting the 6D poses as in the original architecture.

With all N views' aggregated latent vectors, employ a transformer encoder (e.g. Relpose++, including 8 layers of multi-headed self-attention blocks, which is similar to the encoder utilized in the Vision Transformer model), to estimate the 6D camera pose for each camera. This fusion of the feature extractor and transformer can be referred to as a scene encoder $\varepsilon_\Phi$. When provided with N aggregated latent vectors $\{l_{agg(N)}\}$ from N views, the scene encoder generates multi-view conditioned features $\{f_i\}$ that correspond to each respective view ("view features"). This is equivalent to the equation presented in RelPose++, with the difference (modification) being that instead of inputting N input images (views), the input is $l_{agg(i)} \forall i \in \{1 \ldots N\}$.

$$f_i = \mathcal{E}_\Phi^i(l_{agg(1)}, l_{agg(2)} \ldots l_{agg(N)}), \forall i \in \{1 \ldots N\}$$

Figure 4:
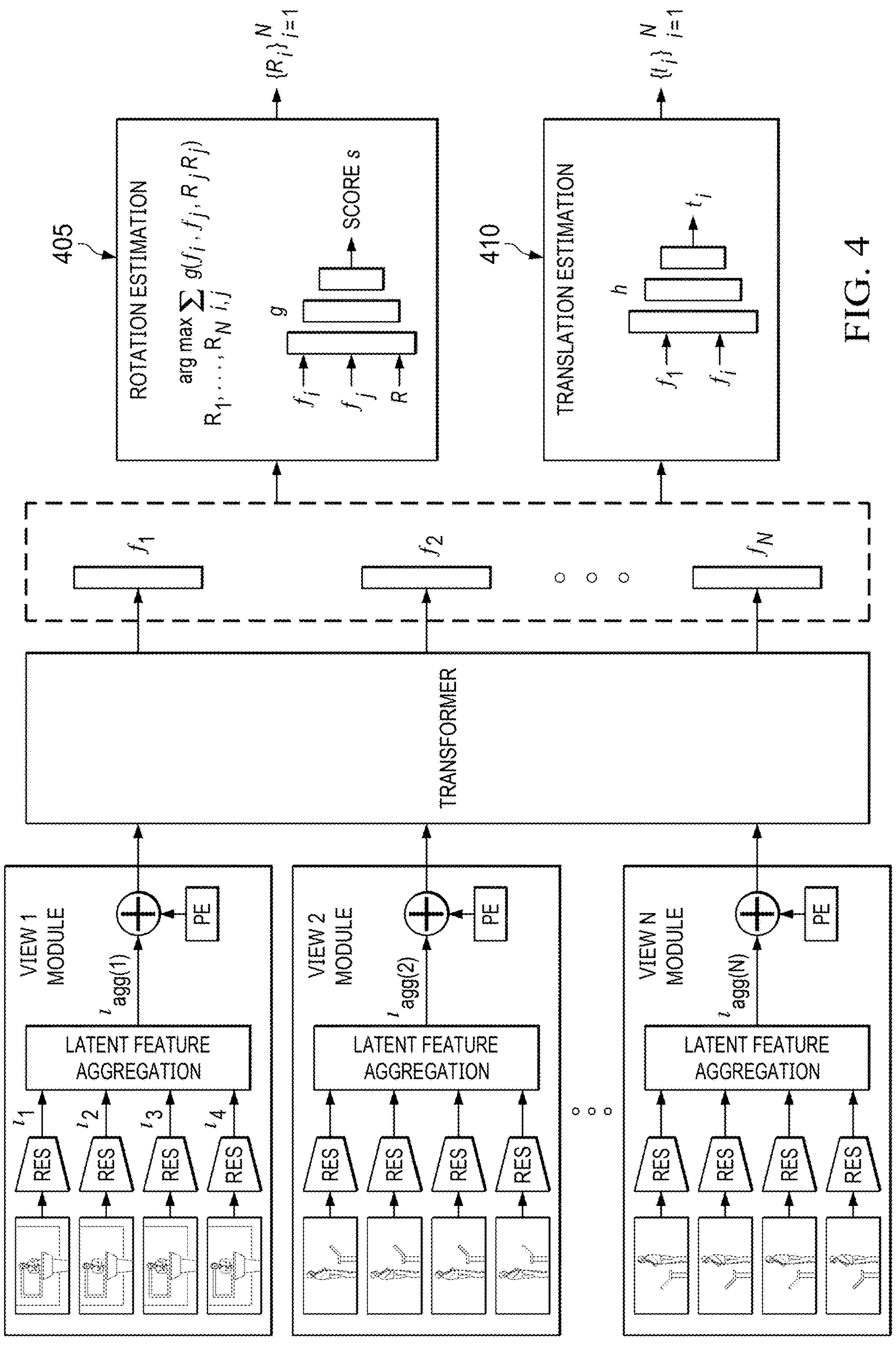
FIG. 4 illustrates an example of camera pose estimation for multiple cameras.

The process of estimating rotations and translations is analogous to Relpose++, where these parameters are estimated independently. The complete architecture, including the transformer module ("Transformer") that takes concatenated bounding box data (indexed) as input and produces view features, and the rotation and translation estimation modules ("Rotation Estimation" and "Translation Estimation" respectively) that take the view features and produces the rotation/translation "scores" (see below), is illustrated in FIG. 4.

For Rotation Estimation (405), the approach is rooted in an energy-based model. It starts by approximating the log-likelihood of the pairwise relative rotations derived from view features $f_i$, $f_j$. This is done using a Multi-Layer Perceptron (MLP) function $g_\theta(f_i, f_j, R_{i\rightarrow j})$ which serves as a negative energy or "score" for pairwise relative rotation $R_{i\rightarrow j}$ for views i and j.

Having inferred the distributions of these pairwise rotations, the process of determining global rotations is framed as an optimization problem. The objective is to identify the mode of the distribution. This is achieved through a two-step approach: 1. Greedy initialization, 2. Block coordinate ascent. The goal is to recover a set of global rotations $\{R_i\}$ (i=view number of N total views) that will maximize the cumulative score of relative rotations $R_{i\rightarrow j}$. This can be mathematically expressed as:

$$\{R_i\}_{i=1}^N = \underset{R_1, \ldots, R_N}{\operatorname{argmax}} \sum_{i,j} g_\theta(f_i, f_j, R_{i\rightarrow j})$$

for N views.

For Translation (410), train a translation prediction module that infers the per-camera translation $\{t_i\}$ given multiple-view features $f_i$ for $\forall i \in \{1 \ldots N\}$. [4].

Single-Frame Floor Plan Construction

In this module, the rotation and translation are taken as input parameters from the 6D camera pose estimator (see above). With the estimated rotation and translation, one can utilize an application programming interface (API) such as PyTorch3D API [14] (specifically the "pytorch3d.renderer.cameras" module, which provides the "get_camera_center" implementation for that example API). This obtains the estimated world coordinates based on the given rotation and translation of the estimated points.

Once the world coordinates are obtained for each camera pose estimation, there are two methods for creating the floor plan.

The first, there is a straightforward approach, by projecting the x, y, and z coordinates onto the x-y plane to derive the floor plan. Like Relpose++, the object of interest is considered as the center (0,0,0) of the world coordinate system. Consequently, the camera pose is determined relative to the object of interest.

The other approach is to use get the plane that is closest to the cameras (x,y,z) coordinates and the stage (0,0,0). Principal Component Analysis (PCA) can be used to find the plane that best fits a set of points in a three-dimensional space. Essentially, PCA is used to find the plane that minimizes the squared perpendicular distance to the points. [5].

Figure 5:
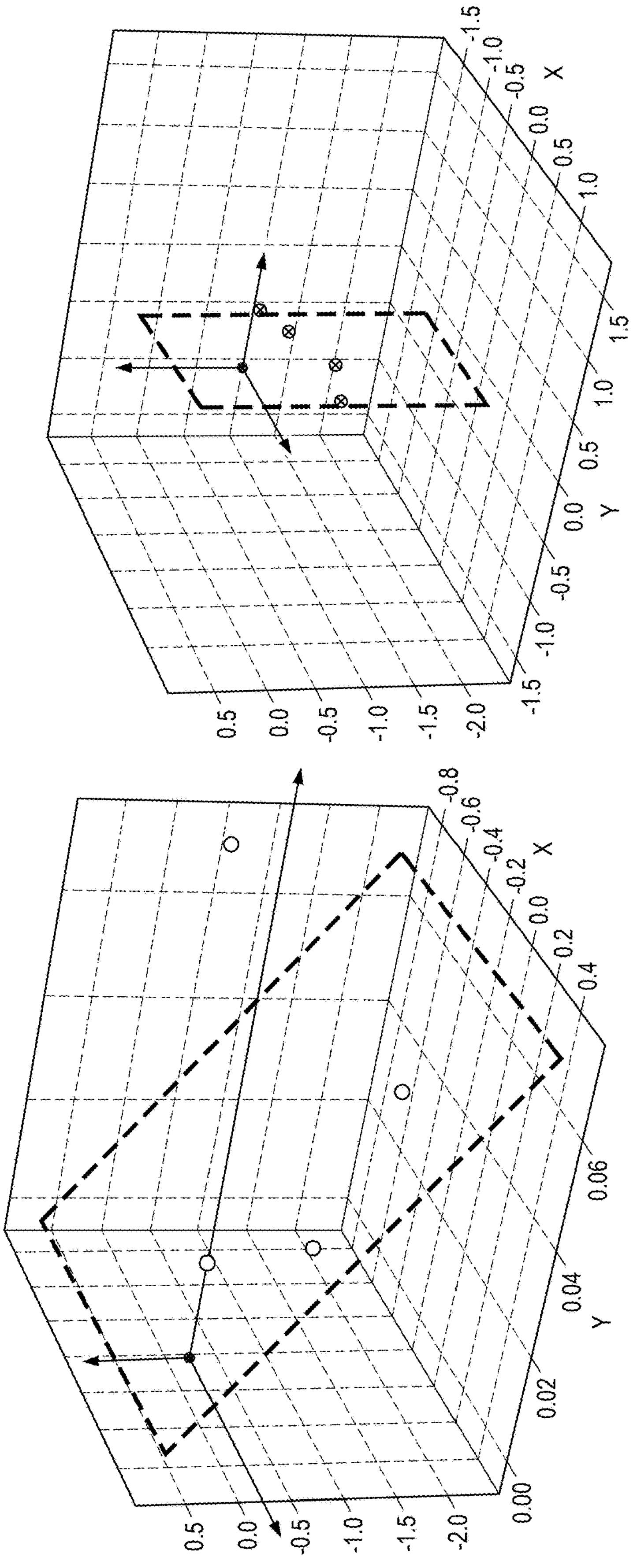
FIG. 5 illustrates an example dimension reduction by projection of N-dimensional data points onto a two-dimensional plane.

Next, the points are projected perpendicularly onto the plane obtained through Principal Component Analysis (PCA). The process is illustrated in FIG. 5. On the left of the figure, all world coordinate points (five in this example), including the four camera points and the stage (point of interest), are depicted as dots. It is important to note that this figure uses different scales for the x, y, and z axes for the sake of visualization convenience. Utilizing PCA, obtain the plane illustrated in the shaded portion, which represents the plane (2D) closest to all five points (3D). Once the plane is obtained, the perpendicular projection of the dots onto the plane is determined, as shown by the x's in the figure on the right. To visualize actual projection, the figure on the right depicts the actual scale of the plane in relation to the original estimated camera points. The x's in this figure represent the projections onto the plane.

Subsequently, one can employ rotation to align this plane parallel to the xy plane to allow for a more intuitive visualization of the projection as a floor plane.

Depending on the characteristics of the videos, both or either of the implementations can be utilized. This methodology shows improved performance compared to other methods.

Metadata

In some embodiments, the 6D world coordinates can be encoded into metadata that is sent in a bitstream with the video image data. The end user can decode the metadata back into the world coordinate data to allow the user to reconstruct the camera poses (e.g., reconstruct/visualize the camera location and shooting angle (i.e. 6DoF) using their video player).

Temporal Consistency

Despite the latent feature aggregation module providing an estimation of the camera pose, the final camera pose of each camera should ideally reflect the actual stationary position of the camera (assuming it is not moving). Moreover, in real-world scenarios, there are often outliers for camera position estimated in the frames that need to be considered when determining the final camera position. To address this issue, use one or more of three types of averages: (1) regular average (avg), (2) interquartile range average (IQR avg), and (3) weighted average (wavg) for each view camera point coordinate. The latter two methods compensate for and eliminate the impact of outliers, ensuring a more accurate and robust estimation of the final camera positions.

The formulas for the three averages are as follows:

$$avg(x, y) = \sum_{c=1}^{F} \frac{(c_t)}{F}$$

$$IQRavg(x, y) = \sum_{c=0.3F}^{0.7F} \frac{(c_t)}{F - 0.6F}$$

$$wavg(x, y) = \sum_{t=1}^{0.3F} \frac{(c_t)}{0.3F} + \sum_{t=0.3F}^{0.7F} \frac{1.5 * (c_t)}{0.7F} + \sum_{t=0.7F}^{F} \frac{(c_t)}{0.3F}$$

where $c_t$ is the $t^{th}$ frame camera floorplan coordinate (of F frames, i.e. temporal averaging), assume that each x, and y coordinate in $c_t$ is sorted in ascending or descending order, F is the total number of frames being averaged over and the 0.3F, 0.6F and 0.7F values are integers (round down if needed).

If the video has limited outliers, the average, IQR average, and weighted average will be relatively close to each other. In some embodiments, all three averages are used, which stabilizes the system even if one or more cameras change their view (one or more of zoom, pan, tilt, dolly, etc. during filming).

Depending on the characteristics of the videos, different XY plane projections and PCA projections can be employed with different temporal consistency filter. In some embodiments, this module incorporates both methods.

In some embodiments, the module includes a temporal consistency filter, which reads a frame from a video file every second and applies a temporal median filter to each frame, excluding the first and last ones. In some embodiments, for the selected videos, one can assume that the camera remains stationary without any magnification or rotation, in which case temporal consistency filtering is unnecessary. In some embodiments, the three methods of averaging presented earlier serve as the consistency filter.

Moving Cameras

In some embodiments, the cameras movement (rotations and translations) over time can be included in the pose estimation, where camera poses will be time varying and the changes in poses will be shown at the end user's side. To have this time dependent information, apply the temporal filtering along the time domain. A sliding window based solution can be used (temporal window). The sliding window method computes the camera pose for each time interval (selectable) of the video stream, rather than for the entire video.

Transformation to User Interface

Figure 6:
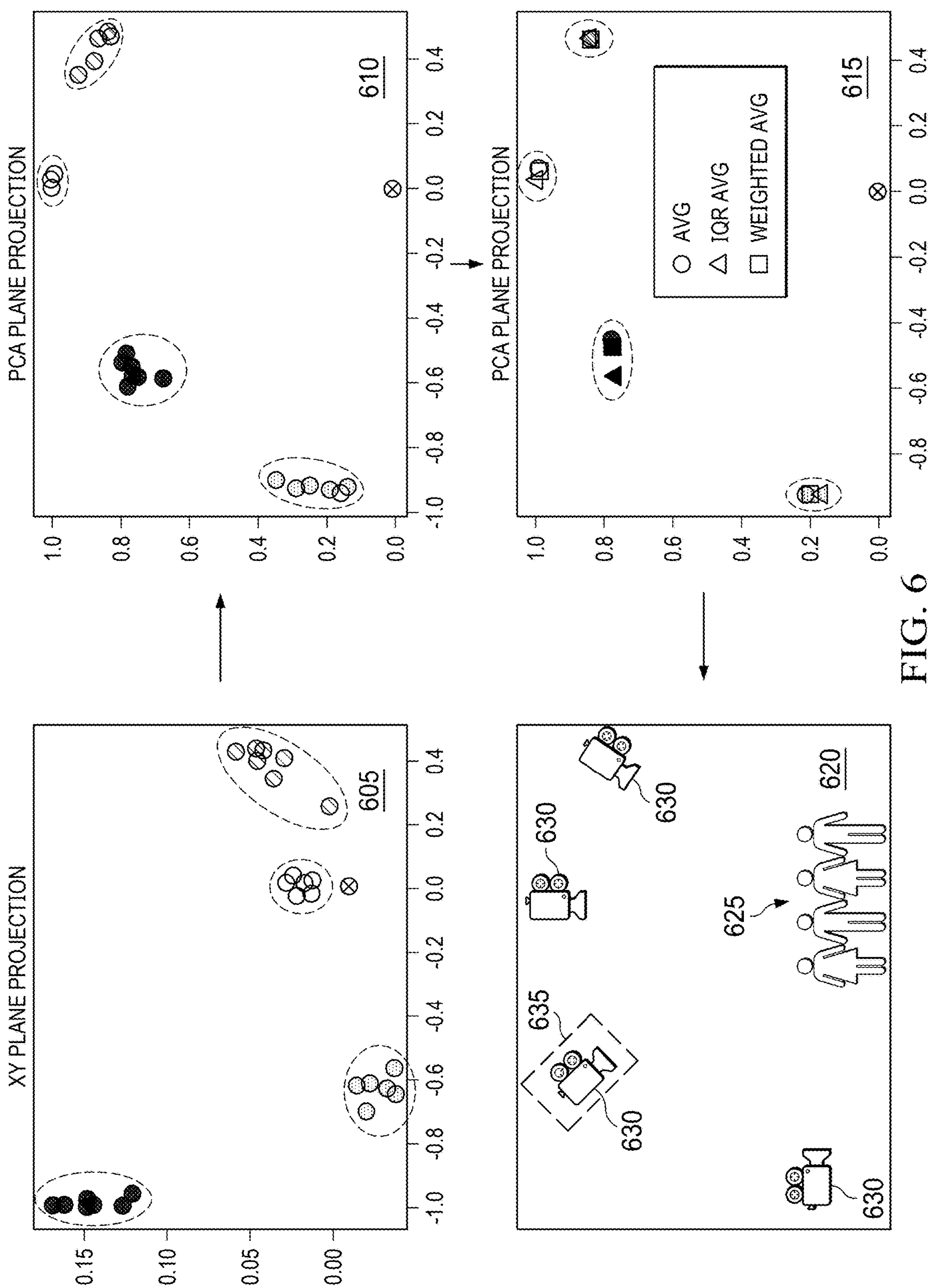
FIG. 6 illustrates an example of converting XY plane projection data to a floor plan-based user interface.

FIG. 6 shows how the data is transformed into a user interface for view control via the floor plan generated by the systems and methods herein. The various views are clustered in the XY plane projection (605) with the X representing the region of interest location. This is projected onto a PCA plane (610), then averaged (615). The user interface (620) places icons based on the averaged PCA plane projection. In this example, camera icons (630) are placed showing their relative placements around the region of interest icon (625) with an indicator (635) showing which camera view is currently being used to in the video image. By pressing/selecting a camera icon (630), the video image can switch to that respective view in real-time.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

REFERENCES

[1] Johannes L Schonberger and Jan-Michael Frahm. "Structure-from-motion revisited," In Proceedings of the IEEE Conference on Computer Vision and Pattern Recognition, pages 4104-4113, 2016.

[2] T. Bailey, H. Durrant-Whyte. "Simultaneous localization and mapping (SLAM): part II." IEEE Robotics & Automation Magazine, 13 (3) (2006), pp. 108-117, 10.1109/mra.2006.1678144

[3] Nister, D; Naroditsky, O.; Bergen, J (January 2004). "Visual Odometry. Computer Vision and Pattern Recognition", 2004. CVPR 2004. Vol. 1. pp. I-652-I-659 Vol. 1. doi:10.1109/CVPR.2004.1315094

[4] Amy Lin, Jason Y Zhang, Deva Ramanan, and Shubham Tulsiani. "Relpose++: Recovering 6d poses from sparse-view observations." arXiv preprint arXiv:2305.04926, 2023

[5] Makiewicz A, Ratajczak W. "Principal Components Analysis (PCA)." Computers & Geosciences. 1993; 19:303-42.

[6] Redmon Joseph, Divvala Santosh, Girshick Ross, and Farhadi Ali. 2016. "You only look once: Unified, real-time object detection." openaccess.thecvf.com/content_cvpr_2016/papers/Redmon_You_Only_Look_CVPR_2016_paper.pdf.

[7] Redmon J, Farhadi A (2017) "Yolo9000: better, faster, stronger" doi.org/10.48550/arXiv.1612.08242

[8] Jocher, G., Chaurasia, A., & Qiu, J. (2023). "YOLO by Ultralytics (Version 8.0.0) [Computer software]." github.com/ultralytics/ultralytics

[9] Zheng Ge, Songtao Liu, Feng Wang, Zeming Li, and Jian Sun. "YOLOX: Exceeding YOLO series in 2021." arXiv: 2107.08430, 2021

[10] Jason Y. Zhang, Deva Ramanan, and Shubham Tulsiani. "RelPose: Predicting probabilistic relative rotation for single objects in the wild." doi.org/10.48550/arXiv.2208.05963

[11] He K, Zhang X, Ren S, Sun J. "Deep residual learning for image recognition." arXiv:1512.03385 (2015).

[12] Dosovitskiy Alexey, Beyer Lucas, Kolesnikov Alexander, Weissenborn Dirk, Zhai Xiaohua, Unterthiner Thomas, Dehghani Mostafa, Minderer Matthias, Heigold Georg, Gelly Sylvain, Uszkoreit Jakob, and Houlsby Neil. 2020. "An image is worth 16×16 words: Transformers for image recognition at scale." arxiv:cs.CV/2010.11929.

[13] S. Shao et al., "Objects365: A large-scale high-quality dataset for object detection", Proc. IEEE/CVF Int. Conf. Comput. Vis. (ICCV), pp. 8430-8439, October 2019.

[14] Nikhila Ravi, Jeremy Reizenstein, David Novotny, Taylor Gordon, Wan-Yen Lo, Justin Johnson, & Georgia Gkioxari (2020). "Accelerating 3D Deep Learning with PyTorch3D", arXiv:2007.08501, (2020).

What is claimed is:

1. A method to construct a 2D floor plan visualization based on views of a plurality of sparse cameras viewing one or more objects of interest, the method comprising:

performing computer object detection on the one or more objects of interest for video from each of the plurality of sparse cameras;

performing feature extraction from the computer object detection;

performing feature aggregation on features of the feature extraction creating latent vectors;

transforming the latent vectors to view features;

estimating camera poses for each of the plurality of sparse cameras based on the view features;

transforming the estimated camera poses into world coordinates; and constructing the 2D floor plan visualization based on the world coordinates.

2. The method of claim 1, further comprising:

integrating the 2D floor plan visualization into a user interface for controlling which view of the plurality of sparse cameras is presented on a screen.

3. The method of claim 1, wherein estimating the camera poses further comprises obtaining rotation and translation metrics based on the latent vectors.

4. The method of claim 3, wherein estimating the camera poses further comprises using deep-learning to obtain the rotation and translation metrics from the view features.

5. The method of claim 1, further comprising:

using temporal consistency filtering on the world coordinates.

6. The method of claim 5, wherein the temporal consistency filtering consists of one or more of regular averaging, interquartile range averaging, and weighted averaging.

7. The method claim 1, wherein the computer object detection further comprises creating bounding boxes for the one or more objects of interest and the latent vectors are based at least in part on image features extracted from the bounding boxes.

8. The method of claim 1, wherein the constructing the 2D floor plan visualization further comprises projecting the world coordinates of the camera poses onto a 2D plane.

9. The method of claim 8, wherein the camera poses are 6D and the world coordinates are 3D.

10. The method of claim 8, wherein the 2D plane is determined by principal component analysis of the world coordinates.

11. The method of claim 1, wherein the world coordinates are determined relative to the one or more objects of interest.

12. The method of claim 1, wherein performing the feature aggregation comprises one or more of: vector addition, vector averaging, vector multiplication, max pooling, min pooling, and principal component analysis.

13. The method of claim 1, further comprising converting the world coordinates to metadata configured to be sent in a bitstream to an end user and allow the end user to reconstruct the camera poses.

14. The method of claim 1, wherein the camera poses are computed over a sliding window of time.

15. A system, comprising:

an object detection module configured to perform computer object detection from video data from a plurality of sparse cameras;

a latent feature extraction module configured to convert data from the object detection module into latent vectors for views of each of the plurality of sparse cameras;

a latent vector aggregation module configured to aggregate the latent vectors into aggregated latent vectors;

a transformer module configured to convert the aggregated latent vectors into view features;

a camera pose estimation module configured to estimate camera poses for each of the plurality of sparse cameras from the view features; and a single-frame floor plan construction module configured to construct a 2D floor plan visualization from the estimated camera poses.

16. The system of claim 15, further comprising a temporal consistency module configured to perform temporal consistency filtering for the estimated camera poses.

17. The system of claim 15, further comprising a device comprising a view screen, the device configured to display video and a user interface on the view screen, the user interface using the 2D floor plan visualization to allow control of which view of the plurality of sparse cameras is presented on the view screen.

18. The system of claim 17, wherein the user interface further comprises icons representing each of the plurality of sparse cameras.

19. The system of claim 18, wherein the user interface further comprises an icon representing the one or more objects of interest.

* * * * *